United States Patent [19]
Matsukawa et al.

[11] Patent Number: 5,498,361
[45] Date of Patent: Mar. 12, 1996

[54] MANGANESE-ZINC SYSTEM FERRITE

[75] Inventors: Atsuhito Matsukawa; Shoji Inoue, both of Chiba, Japan

[73] Assignee: TDK Corporation, Tokyo, Japan

[21] Appl. No.: 256,903

[22] PCT Filed: Dec. 28, 1993

[86] PCT No.: PCT/JP93/01920

§ 371 Date: Aug. 8, 1994

§ 102(e) Date: Aug. 8, 1994

[87] PCT Pub. No.: WO94/14723

PCT Pub. Date: Jul. 7, 1994

[30] Foreign Application Priority Data

Dec. 28, 1992 [JP] Japan ..................... 4-361378

[51] Int. Cl.[6] .................................................. C04B 35/38
[52] U.S. Cl. .................... 252/62.62; 252/62.63; 252/62.56
[58] Field of Search ............... 252/62.62, 62.63, 252/62.56

[56] References Cited

U.S. PATENT DOCUMENTS 3,180,833  4/1965  Pierrot et al. ................ 252/62.52
3,837,910  9/1974  Van der Laan et al. ............... 117/234

FOREIGN PATENT DOCUMENTS 0551907    7/1993   European Pat. Off. .
51-49079   12/1976  Japan .
61-280602  12/1986  Japan .................. 252/62.62
7405793    10/1974  Netherlands .

Primary Examiner—C. Melissa Bonner
Attorney, Agent, or Firm—Oblon, Spivak, McClelland, Maier, & Neustadt

[57] ABSTRACT

For the purpose of improving the initial magnetic permeability of manganese-zinc system ferrite in the high-frequency band of 10 kHz to 500 kHz, a manganese-zinc system ferrite comprising 50–56 mol % of $Fe_2O_3$, 22–39 mol % of MnO, and 8–25 mol % of ZnO is fired after adding thereto up to 800 ppm calculated as $Bi_2O_3$ of a bismuth oxide component and up to 1,200 ppm calculated as $MoO_3$ of a molybdenum oxide component in admixture. It has an average grain diameter of from 5 to 50 μm.

7 Claims, 3 Drawing Sheets

MEAN GRAIN SIZE  $\bar{d} = 27$ μm
$Bi_2O_3$    200 ppm
$MoO_3$    500 ppm

MEAN GRAIN SIZE $\bar{d}=27\,\mu m$
$Bi_2O_3$ 200 ppm
$MoO_3$ 500 ppm

MEAN GRAIN SIZE $\bar{d}=22\,\mu m$
$Bi_2O_3$ 200 ppm
$MoO_3$ 1000 ppm

MEAN GRAIN SIZE $\bar{d} > 50 \mu m$
$Bi_2O_3$    200 ppm

MANGANESE-ZINC SYSTEM FERRITE

FIELD OF THE INVENTION

This invention relates to manganese-zinc system ferrite.

BACKGROUND ART

Among manganese-zinc system ferrites, high magnetic permeability ferrites comprising 50 to 56 mol % of $Fe_2O_3$, 22 to 39 mol % of MnO, and 8 to 25 mol % of ZnO, for example, have been widely used as magnetic cores for wide frequency band transformers and magnetic cores for line filters and noise filters of various communication equipment or the like. These high magnetic permeability ferrites are now required to have high magnetic permeability particularly in the high-frequency range of about 100 kHz to about 500 kHz.

Manganese-zinc system polycrystalline ferrites have the general tendency that initial magnetic permeability $\mu i$ increases with a crystal grain size. One exemplary substance known to promote grain growth is $Bi_2O_3$, which is practically used in Japanese Patent Publication (JP-B) No. 29439/1977 to establish a mean grain size of 50 μm or greater for improving $\mu i$. However, a greater grain size concurrently entails increased losses, especially at high frequencies, due to which only lower frequencies are available.

Then JP-B No. 49079/1976 attempted to improve high-frequency response by adding $Bi_2O_3$ and CaO in admixture. This improvement, however, is effective only at frequencies of up to about 100 kHz, and this material is not practically acceptable as the high magnetic permeability material for line filters or the like which is required to have high $\mu i$ at higher frequencies, for example, over the entire range of from 10 to 500 kHz.

DISCLOSURE OF THE INVENTION

An object of the present invention is to provide a manganese-zinc system ferrite having high magnetic permeability in the high-frequency range, that is, high magnetic permeability over the entire range of from 10 to 500 kHz.

This and other objects are achieved by the present invention which is defined below as (1) to (7).

(1) A manganese-zinc system ferrite comprising 50 to 56 mol % calculated as $Fe_2O_3$ of iron oxide, 22 to 39 mol % calculated as MnO of manganese oxide, and 8 to 25 mol % calculated as ZnO of zinc oxide, the manganese-zinc system ferrite having been sintered after adding thereto up to 800 ppm calculated as $Bi_2O_3$ of a bismuth oxide component and up to 1,200 ppm calculated as $MoO_3$ of a molybdenum oxide component.

(2) The manganese-zinc system ferrite of (1) having an average grain diameter of 5 to 50 μm.

(3) A manganese-zinc system ferrite comprising 50 to 56 mol % calculated as $Fe_2O_3$ of iron oxide, 22 to 39 mol % calculated as MnO of manganese oxide, and 8 to 25 mol % calculated as ZnO of zinc oxide, the manganese-zinc system ferrite having an average grain diameter of 5 to 45 μm.

(4) The manganese-zinc system ferrite of any one of (1) to (3) which further includes 50 to 500 ppm calculated as CaO of calcium oxide.

(5) The manganese-zinc system ferrite of any one of (1) to (4) having an initial magnetic permeability of at least 8,000, at least 8,000, and at least 2,000 at 10 kHz, 100 kHz, and 500 kHz, respectively.

(6) The manganese-zinc system ferrite of any one of (1) to (4) having an initial magnetic permeability of at least 9,000, at least 9,000, and at least 3,000 at 10 kHz, 100 kHz, and 500 kHz, respectively.

(7) The manganese-zinc system ferrite of any one of (1) to (6) wherein during the sintering step, an oxygen partial pressure of at least 25% is maintained at least upon heating from a temperature of at least 1,000° C. to the holding temperature.

EFFECT AND ADVANTAGES OF THE INVENTION

At frequencies of up to 100 kHz, eddy-current losses can be reduced by increasing the electric resistance at grain boundaries. However, grain boundaries switch to act as a capacitance at high frequencies of from 100 to 500 kHz, which means that an increase in electric resistance at grain boundaries does not lead to an increase in the resistance of the entire core, failing to reduce the loss. This is the reason for the drop of $\mu i$ at high frequencies in the prior art.

Presuming that the grain size must be large and distributed uniformly before the loss at 500 kHz can be reduced and $\mu i$ at 100 to 500 kHz can be increased, the inventors have found that use of $MoO_3$ in combination with $Bi_2O_3$ is effective to this end and thereby succeeded in significantly improving $\mu i$ at 10 to 500 kHz.

It is believed that while $MoO_3$ partially sublimates during firing, it is effective for suppressing the growth of crystal grains probably due to this sublimation, thus yielding uniform crystal grains. In the prior art, JP-B No. 28078/1974 proposed in conjunction with magnetic head material to improve the frequency response of $\mu i$ at about 1MHz by adding $MoO_3$ thereto and controlling firing conditions (two stage sintering in air and nitrogen).

However, no example of using $MoO_3$ in high magnetic permeability material is found in the prior art. This is because it was believed that high magnetic permeability materials can be produced by increasing grain size. In practice, however, if $MoO_3$ is singly added to high magnetic permeability material as in the above-referred publication, there occurs a substantial drop of $\mu i$ at about 100 kHz or lower.

BEST MODE FOR CARRYING THE INVENTION INTO EFFECT

Figure 1:
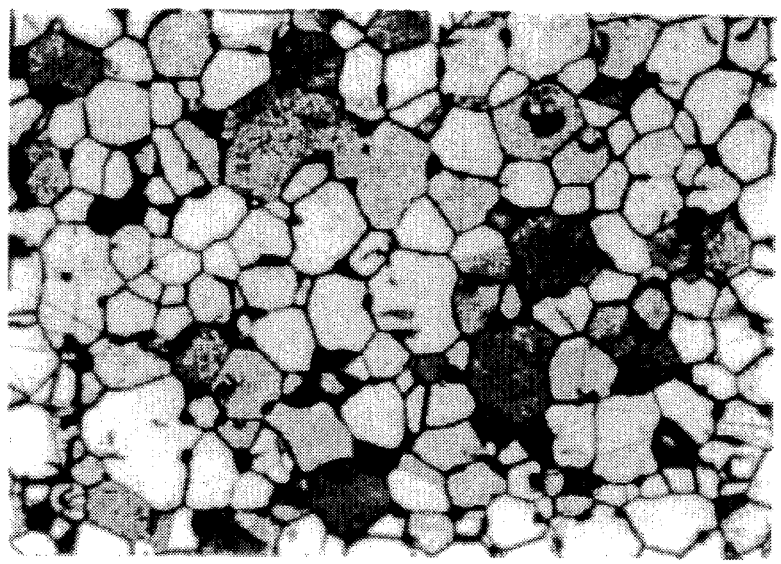
FIG. 1 is a photograph under optical microscope of a manganese-zinc system ferrite according to the invention (Sample No. 22 in Example 3).

Below the illustrative construction of the present invention is described in detail.

The manganese-zinc system ferrite as sintered according to the invention contains iron oxide, manganese oxide, and zinc oxide as major components. These major components are present in amounts of about 50 to 56 mol % calculated as $Fe_2O_3$, about 22 to 39 mol % calculated as MnO, and about 8 to 25 mol % calculated as ZnO. High magnetic permeability is not available outside this range.

Also the manganese-zinc system ferrite of the invention may contain calcium oxide and silicon dioxide as subordinate components. These subordinate components are present in amounts of about 50 to 500 ppm, especially about 100 to 300 ppm calculated as CaO and about 50 to 150 ppm calculated as $SiO_2$. It is to be noted that CaO and $SiO_2$ are generally present at grain boundaries.

The ferrite of the invention defined above further contains bismuth oxide and molybdenum oxide, especially in the form of $Bi_2O_3$ and $MoO_3$. In this regard, since part of the bismuth and molybdenum oxide components added, especially molybdenum oxide component can evaporate or sublimate upon firing, the contents of bismuth oxide and molybdenum oxide in the ferrite do not coincide with the addition amounts in some cases. More specifically, the content of bismuth oxide is about 30 to 100% by weight of the addition amount calculated as $Bi_2O_3$ and the content of molybdenum oxide is about 30 to 100% by weight, especially about 40 to 60% by weight of the addition amount calculated as $MOO_3$.

It is to be noted that the ferrite of the invention may further contain at least one of niobium oxide, indium oxide, vanadium oxide, etc. if necessary. These oxides are preferably present in a total amount of 0 to about 3,000 ppm, provided that they are calculated as $Nb_2O_5$, $In_2O_3$, and $V_2O_5$.

The ferrite of the invention containing the above-mentioned components has an average grain diameter of 5 to 50 μm. The high-frequency response of μi would deteriorate whether the mean grain size is larger or smaller. Better results are obtained when the mean grain size is 5 to 45 μm, especially 10 to 45 μm, further preferably 15 to 35 μm, most preferably 20 to 30 μm. It is to be noted that the mean grain size is determined by etching a mirror finished surface with acid, observing polycrystalline grains under an optical microscope, and averaging the mean diameters of circles converted from the grains.

When the mean grain size is large and distributed uniformly and the coefficient of variation of grain size CV (standard deviation of grain size divided by mean grain size) is small, the high-frequency response of μi is improved to accomplish an initial magnetic permeability μi of at least 8,000, especially at least 9,000, further preferably at least 9,500, for example, about 9,500 to 13,000 at a frequency of 100 kHz and 25° C. and an initial magnetic permeability μi of at least 2,000, especially at least 3,000, further preferably at least 3,500, for example, about 3,500 to 6,000 at a frequency of 500 kHz and 25° C.

The manganese-zinc system ferrite of the invention is prepared by first furnishing a mixture of a conventional iron oxide component, manganese oxide component and zinc oxide component as major components. These major components are mixed so as to provide the above-defined proportion in the final composition of ferrite, with the mixture being used as a source material. Source materials added thereto as subordinate components are calcium oxide or a compound which will convert to calcium oxide upon firing such as calcium carbonate, silicon oxide or a compound which will convert to silicon oxide upon firing, and the like. The source materials for subordinate components are added so as to provide the above-defined proportion in the final composition of magnetic material.

Further, a bismuth oxide component and a molybdenum oxide component are added. The bismuth oxide component used may be $Bi_2O_3$ or instead $Bi_2(SO_4)_3$, etc., with the $Bi_2O_3$ being preferred. The amount of bismuth oxide component added is up to 800 ppm, especially up to 600 ppm, preferably 150 to 450 ppm calculated as $Bi_2O_3$. Addition amounts in excess of this range rather result in a lowering of μi.

The molybdenum oxide component used may be $MoO_3$ or instead $MoCl_3$, etc., with the $MoO_3$ or the like being preferred. The amount of molybdenum oxide component added is up to 1,200 ppm, especially up to 1,000 ppm, preferably 100 to 1,000 ppm calculated as $MoO_3$. Addition amounts in excess of this range rather result in a lowering of μi. It is to be noted that one or more of niobium oxide, indium oxide, and vanadium oxide are added to the source mixture if necessary.

After the major components and additive trace components are mixed in this way, an appropriate binder such as polyvinyl alcohol is added thereto in a small amount, for example, 0.1 to 1.0% by weight, and the mixture is granulated into granules having a diameter of about 80 to 200 μm through a spray dryer, etc. and molded.

Next, the compact is fired, for example, by slowly heating it to a desired sintering temperature at a heating rate of about 50° to 300° C./hr. in an atmosphere having a controlled oxygen concentration, with sintering being completed at that temperature. In this regard, firing is generally carried out by holding at the desired temperature of at least 1,250° C., especially in the range of 1,300° to 1,400° C. for about 4 to 5 hours. After the completion of sintering, the compact is preferably cooled at a cooling rate of about 50° to 300° C./hr. in an atmosphere having a controlled oxygen concentration.

During such sintering, it is preferred to maintain an oxygen partial pressure of at least 25%, especially at least 30%, more preferably 30 to 100% at least upon heating from a temperature of at least 1,000° C. to the holding temperature, more preferably in a temperature range of 1,000° C. and higher. Crystal grains with a relatively large diameter can be created by providing a longer holding time at a higher firing temperature. However, when a combined system of bismuth oxide and molybdenum oxide is used, oxygen firing enables firing at a relatively lower temperature for a relatively short time so that μi at frequencies from 10 kHz to high 500 kHz can be increased without reducing the life of the firing furnace or lowering productivity. If it is attempted to increase μi by providing a longer holding time at a higher firing temperature, there generally accompany a variation of μi and an increase of loss factor. The present invention restrains such a variation of μi and an increase of loss factor by using a combined system of bismuth and molybdenum and effecting oxygen firing.

INDUSTRIAL APPLICABILITY

The manganese-zinc system ferrite of the present invention has high magnetic permeability in a high-frequency band of 100 kHz to 500 kHz, especially at 500 kHz and at the same time, high magnetic permeability on a low-frequency side ranging from frequency 10 kHz to 100 kHz.

EXAMPLE

Examples of the invention are given below by way of illustration.

Example 1

To a mixture of 26 mol % of MnO, 21 mol % of ZnO and 53 mol % of $Fe_2O_3$ as major components were added $CaCO_3$ (200 ppm calculated as CaO) and $SiO_2$ (100 ppm) as subordinate components. To this mixture, $Bi_2O_3$ and $MoO_3$ were added as shown in Table 1, obtaining sample Nos. 1 to 5.

Each of the mixtures, after mixing, was combined with a binder, granulated to a mean particle size of 150 μm through a spray dryer, and compacted. The compact was heated in a nitrogen atmosphere having an oxygen partial pressure $P_{O2}$ of 0.5%, held at 1,270° C. for 3 hours for sintering, and then cooled in an atmosphere having a controlled oxygen partial pressure, obtaining a toroidal core of 31 mm in outer diameter, 19 mm in inner diameter and 8 mm in height. The final composition was subject to fluorescent X-ray analysis to find that the contents of the major components, Ca and Si substantially corresponded to the source material composition and the contents of bismuth oxide and molybdenum oxide were 40 to 60% by weight of their addition amounts.

The thus obtained toroidal cores were measured for initial magnetic permeability μi at frequencies 10 kHz, 100 kHz, and 500 kHz and 25° C. Note that an impedance analyzer was used for the measurement of permeability. The results are shown in Table 1. Sample Nos. 4 and 5 within the scope of the invention had a mean grain size of 20 to 35 μm.

TABLE 1

| Sample No. | Addition amount (ppm) | | μi | | |
|---|---|---|---|---|---|
| | $Bi_2O_3$ | $MoO_3$ | 10 kHz | 100 kHz | 500kHz |
| 1 (comparison) | 0 | 0 | 6300 | 5900 | 1800 |
| 2 (comparison) | 0 | 200 | 5300 | 5000 | 2700 |
| 3 (comparison) | 200 | 0 | 7900 | 7700 | 1700 |
| 4 (invention) | 200 | 200 | 8600 | 8700 | 2200 |
| 5 (invention) | 400 | 200 | 9600 | 9800 | 2300 |

The effectiveness of the invention is evident from the data shown in Table 1. More particularly, it is evident that the invention presents large and uniform crystal grains and significantly increased values of μi at 10 to 500 kHz.

Example 2

Sample Nos. 11 to 14 were obtained by the procedure of Example 1 except that the holding step for sintering was changed to 1,380° C. and 5 hours, the atmosphere used until the holding step was ambient air, and subsequent cooling was in an atmosphere having a controlled oxygen partial pressure. The results are shown in Table 2.

TABLE 2

| Sample No. | Addition amount (ppm) | | μi | | |
|---|---|---|---|---|---|
| | $Bi_2O_3$ | $MoO_3$ | 10 kHz | 100 kHz | 500kHz |
| 11 (comparison) | 0 | 0 | 7200 | 7400 | 3600 |
| 12 (comparison) | 0 | 200 | 6900 | 7200 | 3800 |
| 13 (comparison) | 200 | 0 | 7800 | 8100 | 3300 |
| 14 (invention) | 200 | 200 | 8500 | 9100 | 4000 |

It is to be noted that sample No, 14 within the scope of the invention had a grain size of 20 to 35 μm and the contents of the respective components were substantially equal to those of sample No, 4 in Example 1 It is evident from Table 2 that the frequency response of μi is improved by increasing $P_{O2}$.

Example 3

Sample Nos. 21 to 23 were obtained by the procedure of Example 2 except that $P_{O2}$=100% was maintained until the holding step, The results are shown in Table 3.

TABLE 3

| Sample No. | Addition amount (ppm) | | Mean grain size (μm) | μi | | |
|---|---|---|---|---|---|---|
| | $Bi_2O_3$ | $MoO_3$ | | 10 kHz | 100 kHz | 500 kHz |
| 21 (comparison) | 200 | 0 | >50 | 9800 | 10200 | 2900 |
| 22 (invention) | 200 | 500 | 27 | 9900 | 10600 | 4100 |
| 23 (invention) | 200 | 1000 | 22 | 10500 | 11200 | 3900 |

Figure 2:
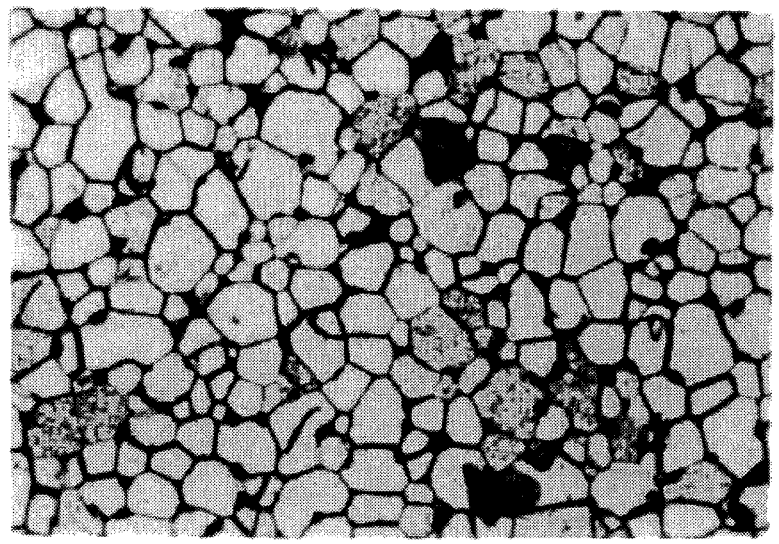
FIG. 2 is a photograph under optical microscope of a manganese-zinc system ferrite according to the invention (Sample No. 23 in Example 3).
Figure 3:
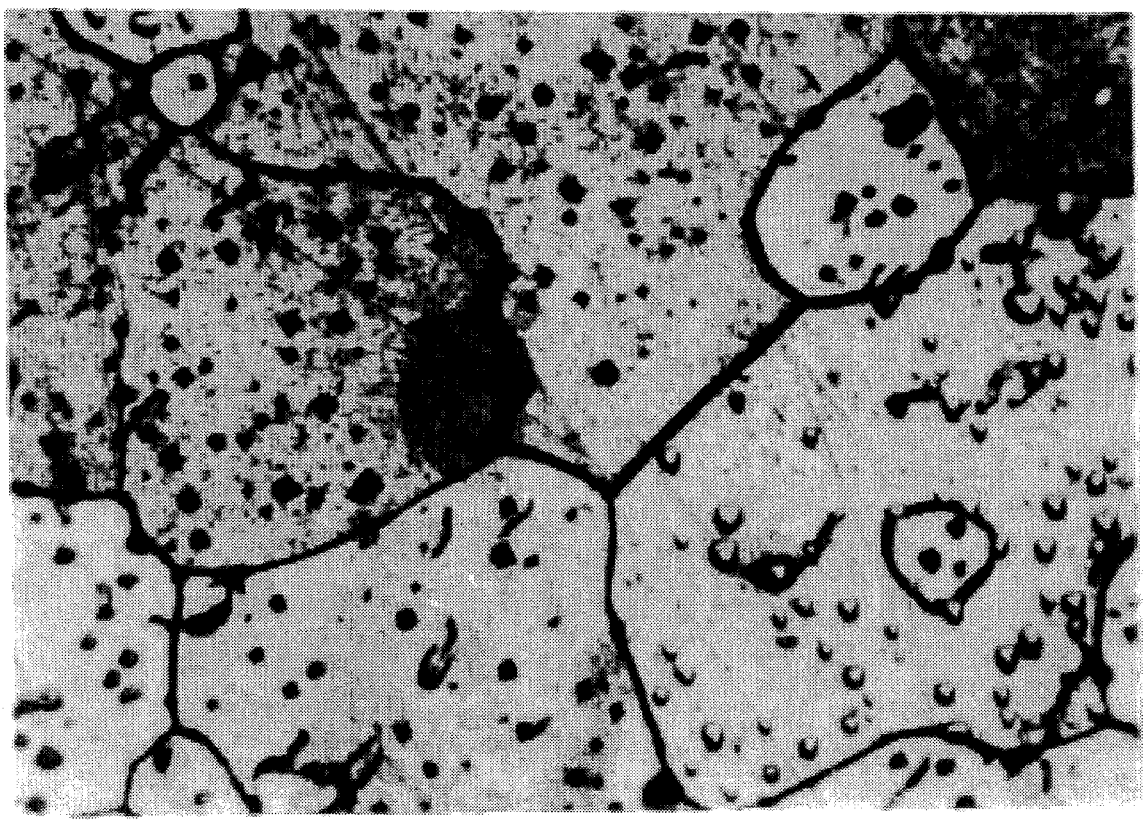
FIG. 3 is a photograph under optical microscope of a prior art manganese-zinc system ferrite (Sample No. 21 in Example 3).

It is evident from Table 3 that a better frequency response of μi is obtained by further increasing $P_{O2}$. FIGS. 1 and 2 are photographs under an optical microscope (300×) of sample Nos. 22 and 23 and FIG. 3 is a photograph under an optical microscope (same magnification) of sample No. 21. The mean grain sizes determined from these photographs are also shown in Table 3.

Example 4

The compositions shown in Table 4 were sintered under the sintering conditions of Example 3.

TABLE 4

| Sample No. | Addition amount (ppm) | | μi | | |
|---|---|---|---|---|---|
| | $Bi_2O_3$ | $MoO_3$ | 10 kHz | 100 kHz | 500kHz |
| 31 (comparison) | 0 | 0 | 9000 | 9200 | 3400 |
| 32 (comparison) | 0 | 400 | 8400 | 8800 | 3800 |
| 33 (invention) | 200 | 400 | 10000 | 10500 | 4100 |
| 34 (invention) | 200 | 800 | 10700 | 11200 | 3900 |

Example 5

Figure 4:
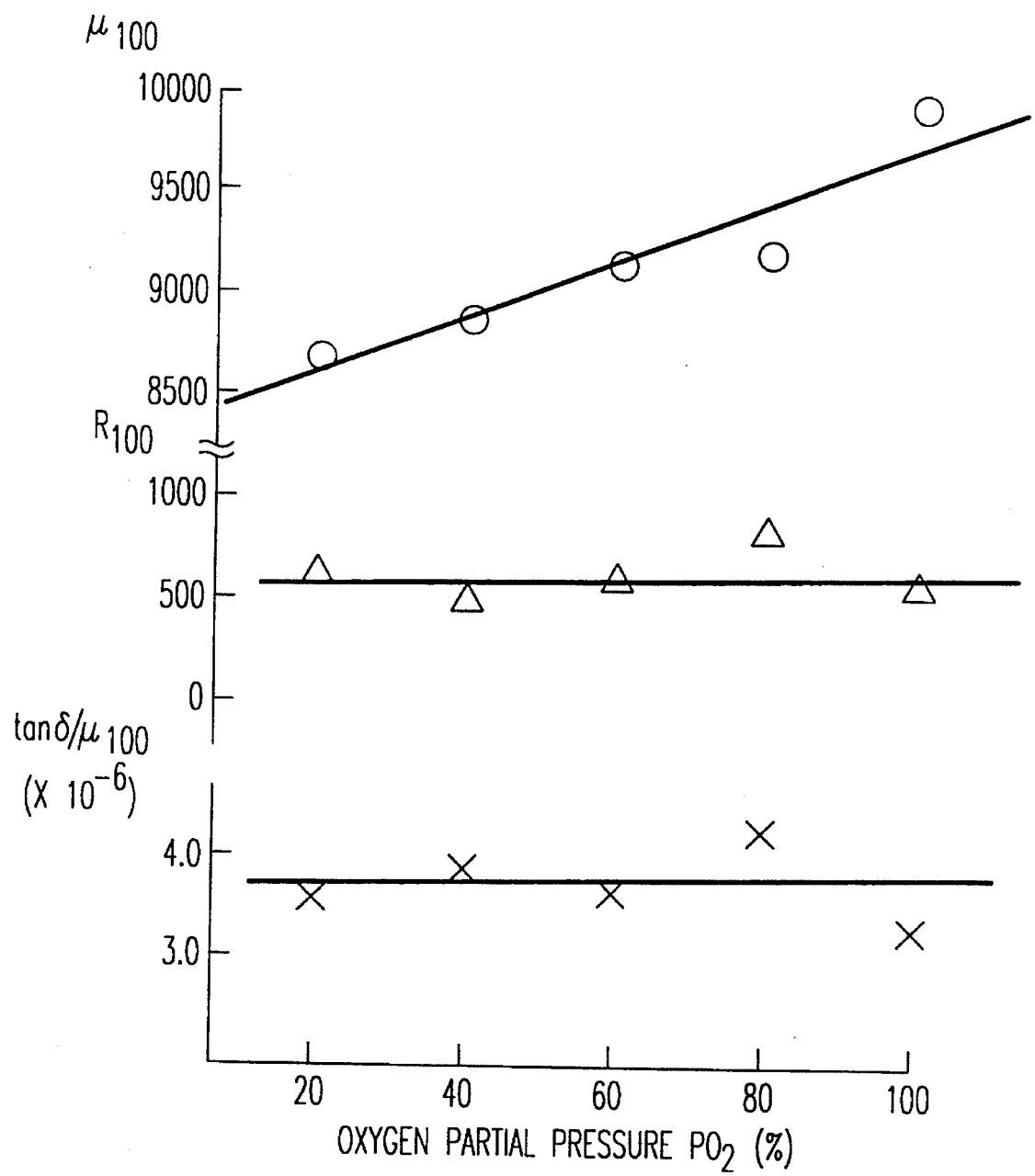
FIG. 4 is a graph showing the relationship of initial magnetic permeability $\mu_{100}$ at frequency 100 kHz, $\mu_{100}$ range $R_{100}$, and loss factor $\tan\delta/\mu_{100}$ to the oxygen partial pressure $P_{o2}$ at the holding temperature during firing.

There was obtained a sample containing 200 ppm of $Bi_2O_3$ and 400 ppm of $MoO_3$ in Example 3 while changing $P_{O2}$ during the process. The samples were measured for μi at 100 kHz (designated $\mu_{100}$), with a range of $\mu_{100}$ of total 27 samples designated $R_{100}$ and an average of loss factor tanδ/$\mu_{100}$ being calculated therefrom. Their relationship to $P_{O2}$ is shown in FIG. 4.

In general, if μi is increased by elevating the holding temperature or extending the holding time, then the variation range R of μi increases and tanδ/μi increases, too. In contrast, FIG. 4 indicates that the variation of μi is rather reduced ($R_{100}$ is constant) and the loss factor does not increase.

We claim:

1. A manganese-zinc system ferrite comprising 50 to 56 mol % calculated as $Fe_2O_3$ of iron oxide, 22 to 39 mol % calculated as MnO of manganese oxide, and 8 to 25 mol % calculated as ZnO of zinc oxide, said manganese-zinc system ferrite having been sintered after adding thereto 150 to 800 ppm calculated as $Bi_2O_3$ of a bismuth oxide component and 100 to 1,200 ppm calculated as MoO$_3$ of a molybdenum oxide component.

2. The manganese-zinc system ferrite of claim 1 having an average grain diameter of 5 to 50 μm.

3. The manganese-zinc system ferrite of any one of claims 1 and 2 which further includes 50 to 500 ppm calculated as CaO of calcium oxide.

4. The manganese-zinc system ferrite of any one of claims 1 and 2 having an initial magnetic permeability of at least 8,000, at least 8,000, and at least 2,000 at 10 kHz, 100 kHz, and 500 kHz, respectively.

5. The manganese-zinc system ferrite of any one of claims 1 and 2 having an initial magnetic permeability of at least 9,000, at least 9,000, and at least 3,000 at 10 kHz, 100 kHz, and 500 kHz, respectively.

6. The manganese-zinc system ferrite of any one of claims 1 and 2 wherein during said manganese-zinc ferrite system being sintered, an oxygen partial pressure of at least 25% is maintained at least upon heating from a temperature of at least 1,000° C. to the sintering temperature.

7. The manganese-zinc system ferrite of claim 1, wherein the amount of said bismuth oxide component added is 150 to 450 ppm, and the amount of said molybdenum oxide component added is 100 to 1,000 ppm.

* * * * *